United States Patent
Hamilton (10) Patent No.: US 7,815,096 B2
(45) Date of Patent: Oct. 19, 2010

(54) LAMINAR FLOW WELL (75) Inventor: Craig J. Hamilton, Toronto (CA)

(73) Assignee: Celestica International Inc., Toronto (CA)

( * ) Notice: Subject to any disclaimer, the term of this patent is extended or adjusted under 35 U.S.C. 154(b) by 0 days.

(21) Appl. No.: 12/292,342

(22) Filed: Nov. 17, 2008

(65) Prior Publication Data

US 2009/0166399 A1    Jul. 2, 2009

Related U.S. Application Data (63) Continuation of application No. PCT/CA2007/000865, filed on May 15, 2007.

(60) Provisional application No. 60/800,396, filed on May 16, 2006.

(51) Int. Cl.
*B23K 1/08* (2006.01)
*B23K 3/06* (2006.01)

(52) U.S. Cl. .................... 228/260; 228/37; 228/56.1

(58) Field of Classification Search .............. None
See application file for complete search history.

(56) References Cited

U.S. PATENT DOCUMENTS

| | | | |
|---|---|---|---|
| 4,046,105 A | | 9/1977 | Gomez |
| 4,139,143 A | * | 2/1979 | Gumprecht ........... 228/180.1 |
| 4,447,001 A | * | 5/1984 | Allen et al. ................ 228/37 |
| 4,465,014 A | * | 8/1984 | Bajka et al. ............... 118/114 |
| 4,526,313 A | * | 7/1985 | Hug et al. ............... 228/180.1 |
| 4,530,457 A | * | 7/1985 | Down ..................... 228/180.21 |
| 4,540,114 A | * | 9/1985 | Pachschwoll ............... 228/37 |
| 4,848,642 A | * | 7/1989 | Kondo ....................... 228/37 |
| 5,368,222 A | * | 11/1994 | Scorta ................... 228/180.1 |
| 5,704,535 A | * | 1/1998 | Thompson, Sr. ............. 228/39 |
| 5,720,426 A | * | 2/1998 | Fothen ..................... 228/260 |
| 5,785,880 A | * | 7/1998 | Heaslip et al. ............. 222/594 |
| 5,794,837 A | | 8/1998 | Cottingham et al. |
| 6,510,978 B1 | * | 1/2003 | Koshi et al. ................ 228/256 |
| 6,851,596 B2 | | 2/2005 | Ogawa |

(Continued)

FOREIGN PATENT DOCUMENTS

JP    56017181 A   *   2/1981

(Continued)

OTHER PUBLICATIONS

International Search Report from PCT/CA2007/000865 completed Aug. 21, 2007, received by applicant Aug. 23, 2007.

*Primary Examiner*—Kiley Stoner
(74) *Attorney, Agent, or Firm*—John R. S. Orange; Brett J. Slaney; Blake Cassels & Graydon LLP (57) ABSTRACT

It has been observed that turbulent solder flow, particularly at the opening of a conventional flow well, correlates to a greater degree of Cu dissolution of the PTH barrels of a PCB, especially those that are aligned with the opening. A more laminar solder flow is created to more evenly distribute the solder flow and thus reduce the rate of Cu dissolution near the flow well opening, particularly during a PTH rework process. In one aspect, a flow well for a soldering machine is provided comprising a flow distribution element, wherein solder flowing into the flow well is distributed by the flow distribution element to provide a more laminar flow.

20 Claims, 7 Drawing Sheets

U.S. PATENT DOCUMENTS

| | | | |
|---|---|---|---|
| 2001/0020637 A1* | 9/2001 | Zen | 228/260 |
| 2002/0047039 A1* | 4/2002 | Mawatari | 228/260 |
| 2002/0162879 A1* | 11/2002 | Schouten et al. | 228/259 |
| 2003/0080175 A1* | 5/2003 | Toba | 228/37 |
| 2003/0141324 A1* | 7/2003 | Kapaj et al. | 222/598 |
| 2007/0241142 A1* | 10/2007 | McIntosh et al. | 222/594 |

FOREIGN PATENT DOCUMENTS

| | | | |
|---|---|---|---|
| JP | 62292255 A | * | 12/1987 |
| JP | 1044266 A | | 2/1989 |
| JP | 1271061 A | | 10/1989 |
| JP | 01271061 A | * | 10/1989 |
| JP | 02187261 A | * | 7/1990 |
| JP | 03146259 A | * | 6/1991 |
| JP | 7185791 A | | 7/1995 |
| JP | 2003-275867 A | * | 9/2003 |

* cited by examiner

LAMINAR FLOW WELL

CROSS-REFERENCE TO RELATED APPLICATIONS

This application is a continuation of International PCT Application No. PCT/CA2007/000865 filed on May 15, 2007 which claims priority from U.S. Provisional Application No. 60/800,396 filed on May 16, 2006, the contents of which are both hereby incorporated by reference.

TECHNICAL FIELD

The following relates to soldering and has particular utility in solder fountain flow wells used in pin through hole (PTH) rework processes.

BACKGROUND

Many electronic components, e.g. connectors, have a series of protruding pins that are used to connect such components to a printed circuit board (PCB) by way of pin through hole (PTH) barrels installed in the PCB. PTH barrels are generally "spool" shaped and include an annular sleeve defining a central aperture which extends through the thickness of the PCB and an upper and lower annular ring attached to the sleeve that extend over a portion of the upper and lower surfaces of the PCB in the vicinity of the sleeve. The interface of the rings and the sleeves of a PTH barrel is often referred to as a barrel "knee". The PTH barrels are typically made from copper.

To attach the component to the PCB, the pins are aligned with respective PTH barrels, the pins are fed through the central apertures defined by the respective barrels, and the pins are then soldered to the barrels as is well known in the art. In order to decrease the time in soldering the pins, a wave solder machine may be used to effect the primary attachment of the component to the PCB. Often, however, certain ones of the solder joints require reworking and undergo a rework process. Reworking the solder joints can be accomplished using a solder fountain.

A solder fountain includes a solder pot that contains a quantity of molten solder and a pump for pumping the molten solder up through a flow well which provides a wave of liquid solder that is used to rework the solder joints of the PTH barrels. Unused solder is re-circulated to the solder pot using a spill mechanism. The pump is typically adjustable such that the flow rate of the solder can be controlled. The temperature of the molten solder can also be controlled in order for the solder in the solder wave to attain a particular temperature.

As is well know in the art, solder is a fusible metal alloy, often made of tin and lead, which is melted to join metallic surfaces. The use of lead in general has become increasingly undesirable, leading to much interest in lead-free solders. Such lead-free solders contain tin, copper, silver, and sometimes bismuth, indium, zinc, and other metals in varying amounts. The lead-free replacements for conventional solder have higher melting points, and often this leads to the need to re-engineer some components and materials used in electronic assemblies such as PCBs. Lead-free solder joints may produce mechanically weaker joints depending on service and manufacture conditions, which may lead to a decrease in reliability using such solders.

Of particular concern in PTH rework applications is copper (Cu) dissolution. Cu dissolution often occurs when the Cu rings of the PTH barrels come into contact with the molten solder alloy during the rework process. Cu dissolution results in a deterioration of the barrel such that the ring may become detached from the sleeve or in some cases be completely dissolved. The occurrence of Cu dissolution is not only prevalent in lead-free solder alloys, but also eutectic leaded solder alloys, although generally to a lesser extent. The combined change in alloy composition and corresponding higher melting point of the lead-free solder requires that the molten solder maintain a higher operating temperature, thus often accelerating the rate and consequently the extent of Cu dissolution. The barrel knee is typically the most vulnerable to Cu dissolution. As a result, the acceptable contact time for lead-free solder is generally much lower than for leaded solder. For example, studies have shown that a copper barrel knee can only withstand approximately 30 seconds of contact time using SAC405 lead-free alloy, whereas a copper barrel knee exposed to leaded solders is known, in many situations, to be able to withstand approximately 60-90 seconds of contact time before complete dissolution of the knee occurs on the same test vehicle.

It is therefore an object of the following to obviate or mitigate the above-mentioned disadvantages.

SUMMARY

It has been observed that turbulent solder flow, particularly at the opening of a conventional flow well, correlates to a greater degree of Cu dissolution of the PTH barrels of a PCB, especially those that are aligned with the opening. A more laminar solder flow can be produced to more evenly distribute the solder flow and thus reduce the rate of Cu dissolution near the flow well opening, particularly during a PTH rework process.

In one aspect, a flow well for a solder fountain is provided comprising an opening for receiving a flow of solder from the solder fountain; an open face for providing a surface of solder; and a flow distribution element between the opening and the surface, the flow distribution element being configured to redirect solder flow away from the opening.

In another aspect, there is provided a flow distribution element for a flow well comprising a member for directing solder flow away from an opening in the flow well and an attachment mechanism for securing the flow distribution element over the opening.

In yet another aspect, there is provided a method for soldering a circuit board using a solder fountain comprising providing a flow well having an opening, an open face and a flow distribution element between the opening and the open face; feeding solder into the flow well; redirecting the solder away from the opening using the flow distribution element; and providing a surface of solder at the open face.

BRIEF DESCRIPTION OF THE DRAWINGS

An embodiment of the invention will now be described by way of example only with reference to the appended drawings wherein.

DETAILED DESCRIPTION OF THE DRAWINGS

Figure 1:
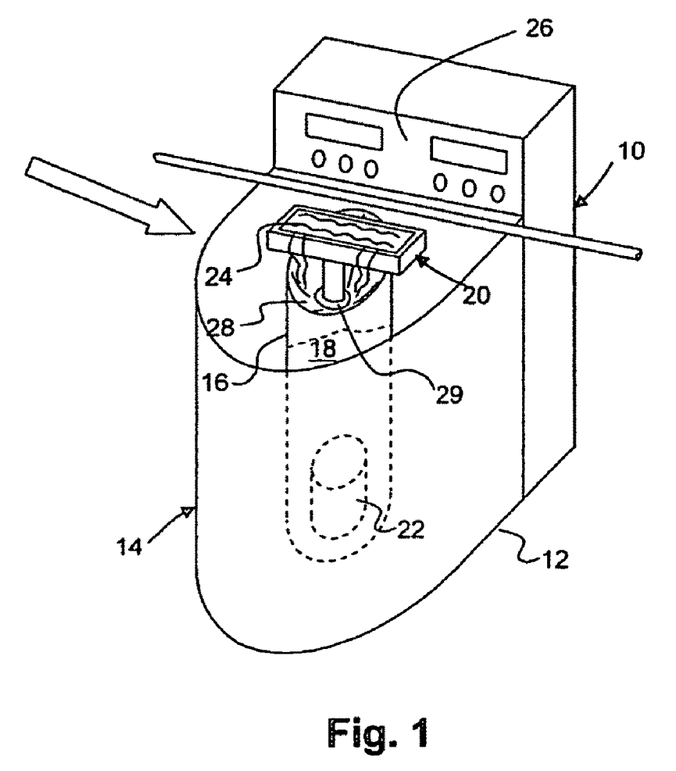
FIG. 1 is a perspective view of a solder fountain machine.

Referring therefore to FIG. 1, a solder fountain machine is generally denoted by numeral 10. The solder fountain 10 has a base 12 supporting a protective housing 14. The housing 14 surrounds a solder pot 16 containing a quantity of molten solder 18. A flow well 20 extends upwardly from the solder pot 16. A pump 22 contained in the solder pot 16 pumps the molten solder 18 through the flow well 20 creating a solder wave 24. The fountain 10 also includes a control box 26 that is used to control the operation of the solder fountain 10, e.g., the flow rate of the pump. The solder wave 24 spills over and returns to the solder pot 16 via an inverted frustum 28 with a central aperture 29 that covers the solder pot 16.

Figure 2:
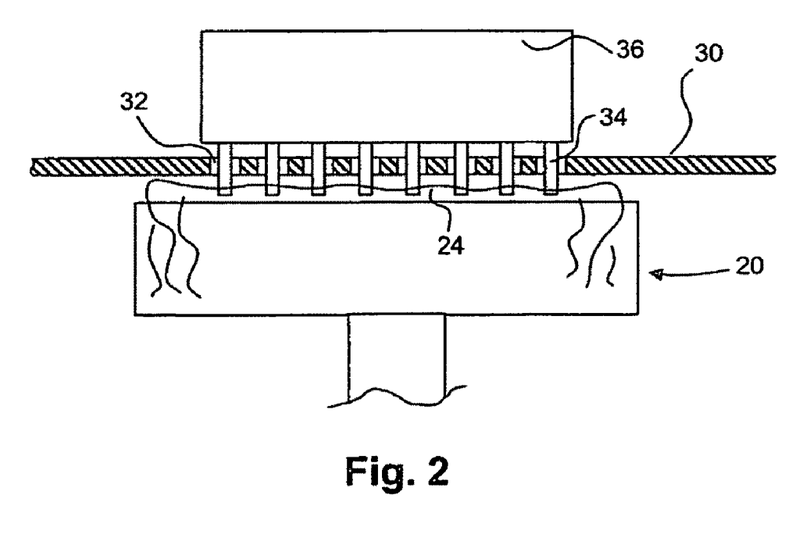
FIG. 2 is an elevation view of the flow well shown in FIG. 1 showing a PCB in cross section.
Figure 3A:
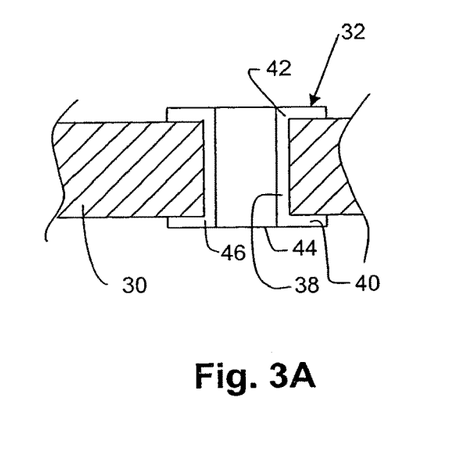
FIG. 3A is an enlarged sectional view of the PCB of FIG. 2 prior to pin insertion.
Figure 3B:
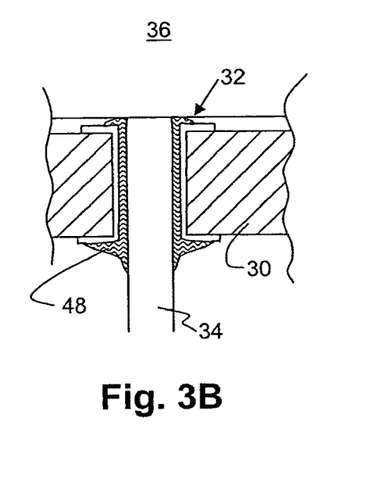
FIG. 3B is an enlarged sectional view of the PCB of FIG. 2 following pin insertion and soldering.

As best seen in FIG. 2, a PCB 30 has a series of copper PTH barrels 32 that are aligned on the board 30 and correspond to the arrangement of a series of pins 34 extending from a connector 36. A exemplary barrel 32 is shown in section in FIG. 3A prior to pin insertion. The barrel 32 comprises an annular sleeve 38, a lower annular ring 40 and an upper annular ring 42. The interface of the lower ring 40 and the sleeve 38 defines a left barrel knee 46 and a right barrel knee 44. As shown in FIG. 3B, the solder wave 24, coming into contact with the barrels 32 when the pins 34 are fed through respective ones of the barrels 32, will effectively solder the connector 36 to the PCB 30 to create a solder joint 48.

In electronics manufacturing, in particular Electronics Manufacturing Services (EMS), there is often a need to repair/rework defective PTH connectors 36 which are soldered to a PCB 30. In order to repair/rework the defective connectors 36, a solder fountain 30 (or "mini pot") is used. The solder fountain 10 reworks a PTH connector 36 by pumping a small amount of molten solder 18 through the flow well 20 to create a solder wave 24 as explained above. The flow well 20 is sized to substantially correspond to the dimensions of the connector 36 being reworked as best seen in FIG. 2.

Once a solder fountain 10 rework process has been initiated on a PCB 30, there is typically a fixed number of solder cycles that can be performed on the PCB before the board is irreparably damaged, i.e., each solder cycle increases the risk of damage to the PTH barrels 32 and the laminate board 30 itself. Therefore, it is desirable to perform the rework in the fewest number of solder cycles as possible. If the PCB 30 is exposed to molten solder 18 for a relatively large amount of cumulative contact time (e.g. 90+ seconds for leaded alloys and approximately 30+ seconds for lead-free alloys), the PCB 30 may be irreparable at the time of rework or if a rework is required years later. Cu dissolution often occurs due to such prolonged contact time.

It has been observed, when using a conventional flow well (not shown), that barrels 32 located near the center of the connector 36 being reworked exhibit a higher degree of Cu dissolution (and thus damage) at the knees 44, 46 of the barrel 32 when compared to the barrels 32 located nearer the outer edges of the same connector 36.

A conventional flow well that has been traditionally used with a solder fountain 10 uses a single circular or oval opening for pumping molten solder 18 from the solder pot 16 to the flow well base. The solder makes direct contact with the PCB 30 undergoing the rework process and spills over the two ends of the flow well. It was determined that such flow of solder from a single opening correlates to a higher flow rate of solder (and thus a turbulent solder flow), which in turn correlates to a higher degree of Cu dissolution at the "central" PTH barrels 32, the effects of which are explained in greater detail below. The central barrels 32 are positioned immediately above the opening and, as such, can experience approximately 100% of the flow of molten solder as it spreads out to create the solder wave 24.

In order to lessen the Cu dissolution at the central portions of the connector 36, it was determined, based on the identification of the above correlation, that a more laminar flow of molten solder to the flow well should be used. In order to minimize turbulent solder flow and create a laminar solder flow, a flow distribution element (e.g. baffle, diffuser etc.) is used to distribute the solder flow before it makes contact with the PCB 30.

In a preferred embodiment, shown in FIGS. 4-7, the single opening feeding molten solder to the flow well in a solder fountain 10 is modified to provide a plurality of openings in order to redirect or baffle the solder flow away from or about the opening. The multiple openings are configured to change the substantially vertical direction of solder flow from the single opening into a more horizontal and thus laminar flow vector, to distribute the force of the solder 18 before making contact with the barrels 32 and PCB 30. The overall solder flow is consequently more laminar, which has been shown to reduce the degree of Cu dissolution as will be explained in greater detail below.

Figure 4:
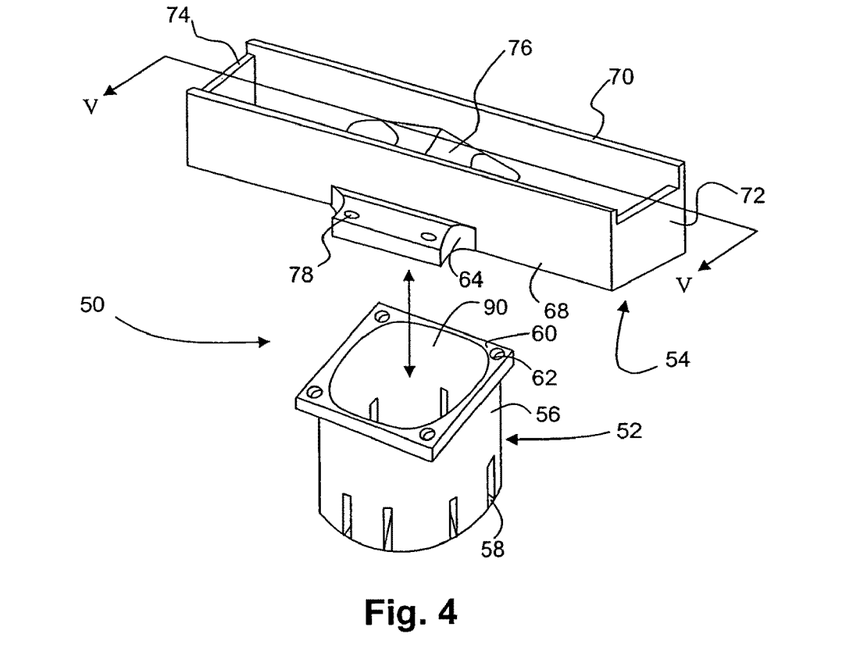
FIG. 4 is an exploded perspective view of a laminar flow well.
Figure 5:
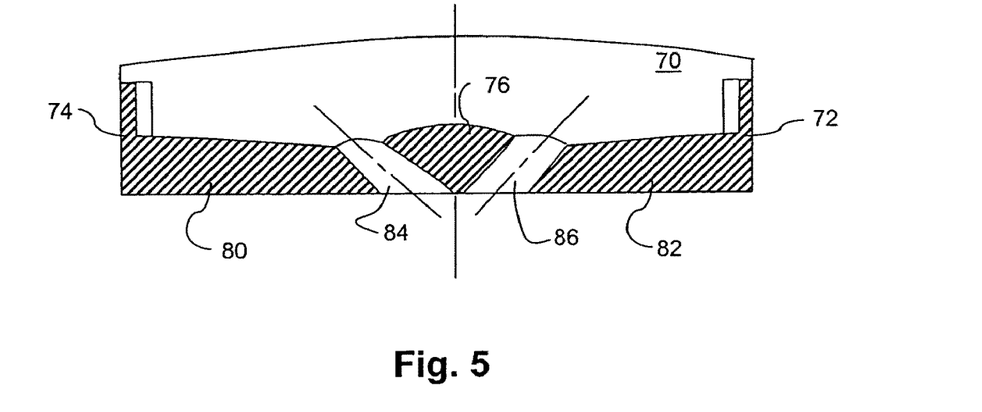
FIG. 5 is a sectional view of the flow well shown in FIG. 4 along the live V-V.
Figure 6:
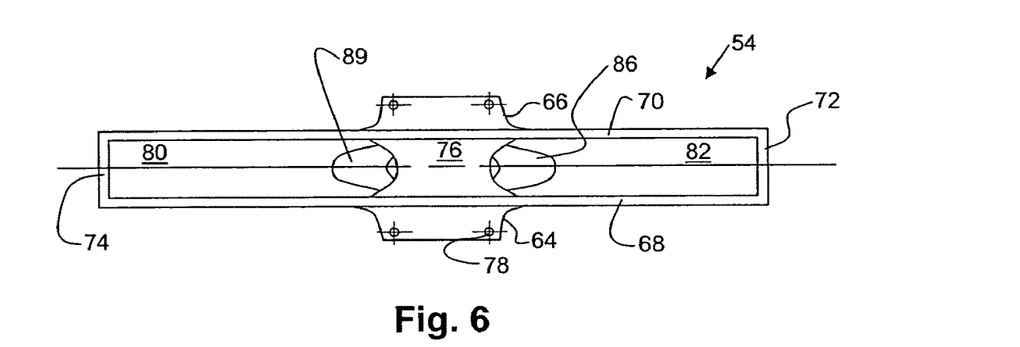
FIG. 6 is a top view of the flow well shown in FIG. 4.
Figure 7:
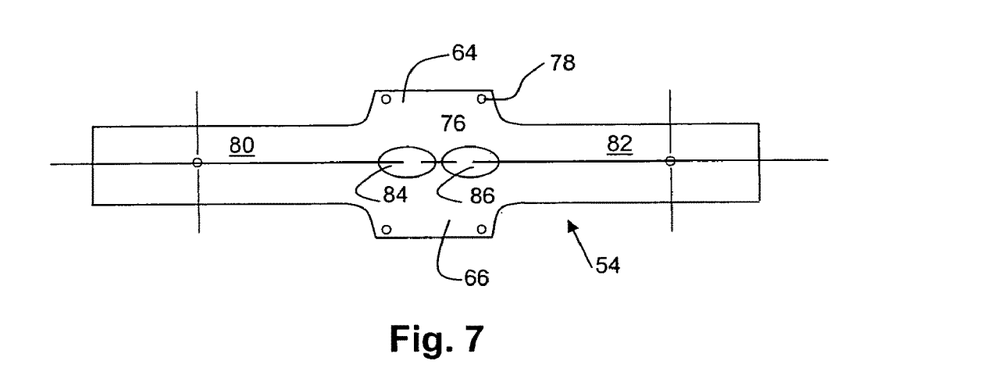
FIG. 7 is a bottom view of the flow well base shown in FIG. 4.

Referring now to FIG. 4, a flow well 50 for producing a more laminar solder flow comprises an adapter 52 for connecting the flow well 50 to the outlet (not shown) of the pump 22, and a base 54 for providing the solder wave 24.

The adapter 52 includes a slotted sleeve 56 that is sized and shaped to fit over the outlet of the pump 22. The sleeve 56 includes a series of slots 58 to allow a snug fitment of the adapter 52 over the end of the outlet. The adapter 52 also includes a flange 60 at the end opposite that having the slots 58. The flange 60 includes a series of holes 62 for attaching the adapter 52 to the base 54 and defines an opening 90 to permit the flow of solder 18 to the base 54.

The base 54 has a pair of side walls 68, 70 separated by a pair of end walls 72, 74 at respective ends. The end walls 72 74 have a height that is less than the height of the side walls 68, 70 to allow for solder to spill over the base 54 and re-circulate to the solder pot 16. The sidewall 68 has a first flange 64 extending from its mid-portion and the sidewall 70 has a second flange 66 extending from its mid-portion. Aligned with the flanges 64, 66 is a baffle member 76 formed in the floor of the base 54 to provide a flow distribution element. The baffle member 76 directs solder flowing through the adapter 52 towards each end of the base 54 using a pair of inclined passages 84, 86. A first floor portion 80 slopes inwardly from the end wall 74 towards the inclined passage 84 and a second floor portion 82 slopes inwardly from the end wall 72 towards the inclined passage 86. The flanges 62, 66 include a series of holes 78. The holes 78 are aligned with the holes 62 on the adapter 52 in order to allow the adapter 52 to be attached to the base 54.

The lower ends of the inclined passages 84, 86 are adjacent and diverge from each other such that their upper ends emerge on opposite sides of the baffle member 76. The lower ends of the passages 84, 86 are positioned over the opening 90. As a result, solder flowing through the opening 90 is directed in either direction around the baffle member 76 in a more horizontal manner when compared to its direction when emerging from the opening 90 alone. This altered flow results in a more laminar solder flow.

The effects of Cu dissolution during PTH rework was observed and compared between a conventional, single opening flow well (not shown) and the flow well 50 shown in FIG. 4, which provides a more laminar flow. It was found experimentally, that the more laminar solder flow rate resulted in a lesser degree of Cu dissolution overall when compared to a more turbulent solder flow rate from a single opening, in particular in the vicinity of the opening 90.

Figure 10:
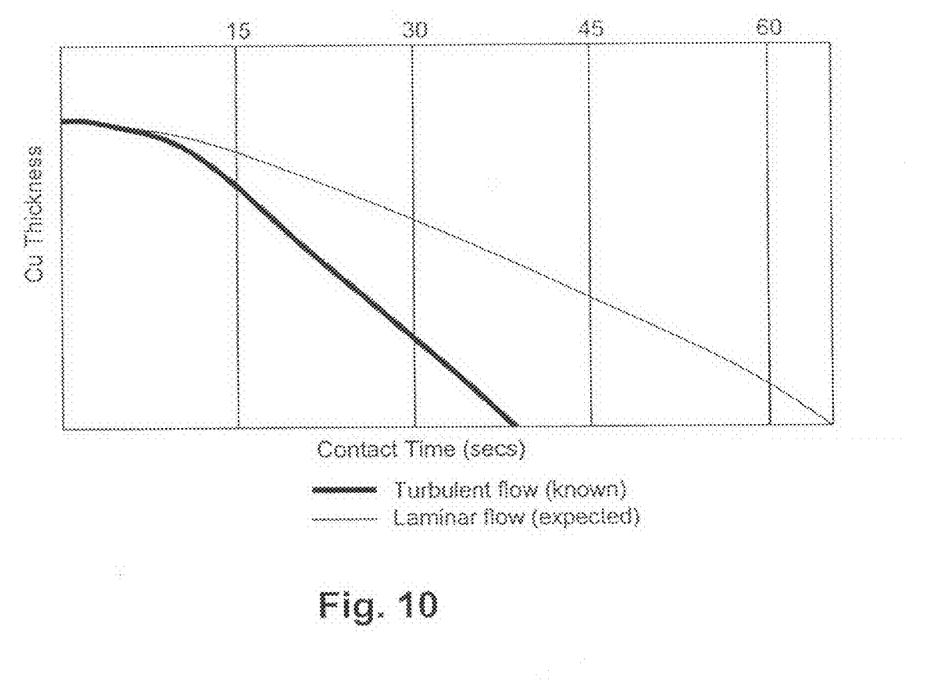
FIG. 10 is a graph illustrating Cu dissolution rate for turbulent and laminar solder flow.

The relatively turbulent flow rate of a conventional flow well was compared with the more laminar flow rate of the flow well 50 for different contact times. The constant variables for the molten solder 18 included a solder pot temperature of 265° C. and a PCB preheat temperature of 150° C. The contact times used were based on previous knowledge that a turbulent flow rate will experience Cu dissolution of approximately 100% (complete dissolution of the barrel knee 44, 46) in approximately 30 seconds. The graph shown in FIG. 10 compares the dissolution rate of the conventional turbulent flow well (thick line) with the expected dissolution rate for the more laminar flow well 50 (thin line). It has been determined that in many cases, the Cu dissolution rate for a conventional flow well is approximately 0.030 mils/sec.

In order to determine the effects of Cu dissolution according to the above experiment, a cross-section of the PCB 30 was taken to allow examination of the barrels 32 at both the mid-portion and the ends of the connector 36. The Cu thickness at the ring 40 and the knees 44, 46 was measured. The initial Cu thickness for the knee of the barrel 32 is approximately 1.15 mils.

It was found that the more laminar flow rate achieved using the flow well 50 resulted in an approximate Cu dissolution rate of 0.02 mils/sec, which is about a 33% improvement over the conventional, more turbulent flow well. The results of the above are illustrated in the charts shown in FIGS. 11-13. The following results used a contact time of between 20 and 25 seconds.

Figure 11:
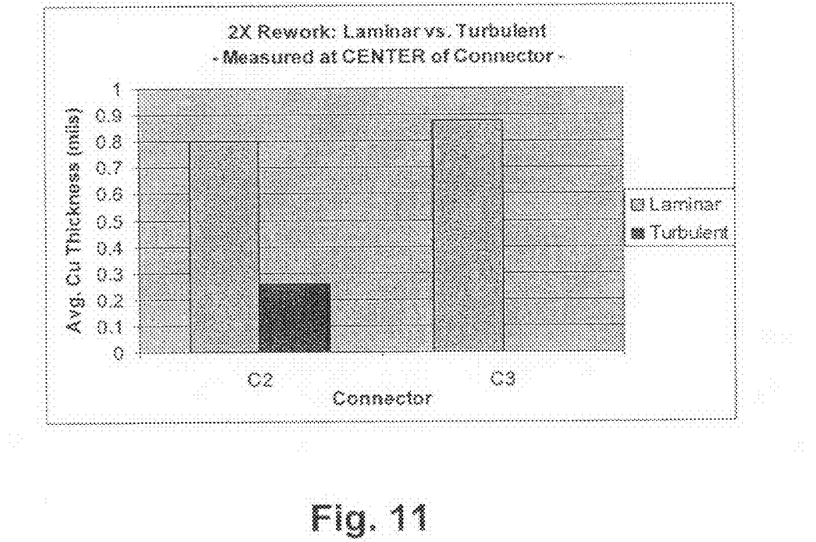
FIG. 11 is a chart comparing average Cu thickness for turbulent and laminar solder flow at the center of the connector shown in FIG. 2.

In FIG. 11, the average Cu thickness for the laminar and turbulent flow is compared for two different connectors on the same board (i.e. C2 and C3). The measurements were taken near the center of the connectors. The average Cu thickness is determined by averaging the thickness of the left knee 46 and right knee 44 as measured once the board and barrels are in cross-section. For the C2 connector, the average Cu thickness was approximately 0.80 mils for the flow well 50 and approximately 0.26 mils for the conventional, more turbulent flow well. For the C3 connector, the average Cu thickness was approximately 0.88 mils for the flow well 50 and effectively zero (0) mils for the conventional, more turbulent flow well.

Figure 12:
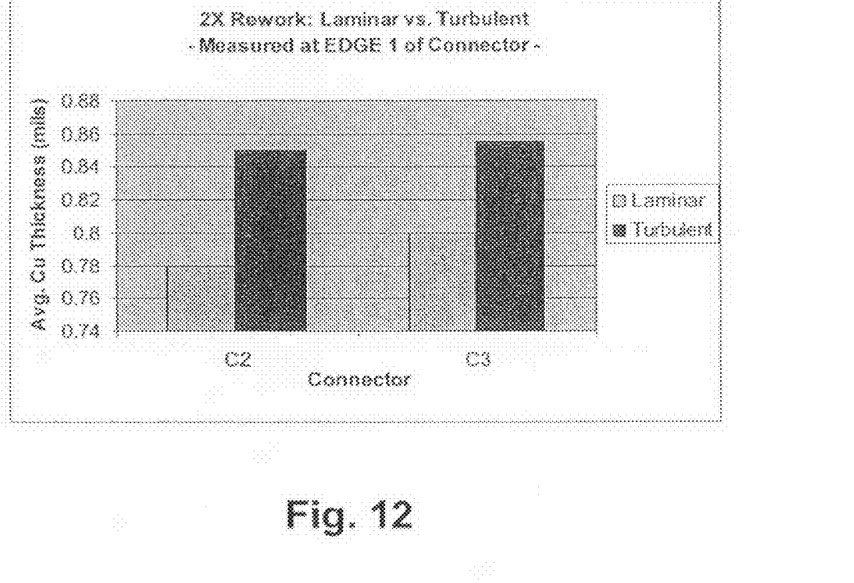
FIG. 12 is a chart comparing average Cu thickness for turbulent and laminar solder flow at one edge of the connector shown in FIG. 2.

FIG. 12 compares the average Cu thickness for laminar and turbulent flow as measured at the edge of the respective connectors. For the C2 connector, the average Cu thickness was approximately 0.78 mils for the flow well 50 and approximately 0.85 mils for the conventional, more turbulent flow well. For the C3 connector, the average Cu thickness was approximately 0.80 mils for the flow well 50 and approximately 0.86 mils for the conventional, more turbulent flow well.

Figure 13:
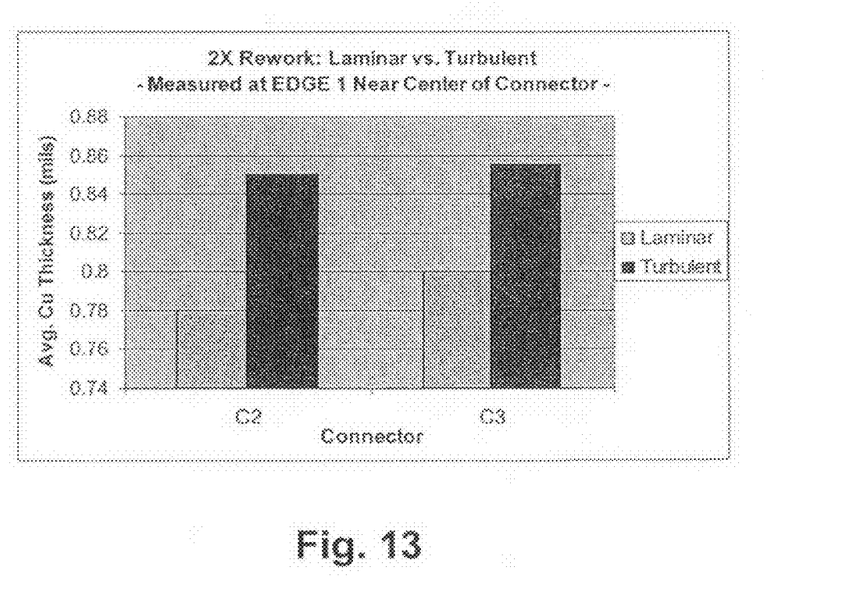
FIG. 13 is a chart comparing average Cu thickness for turbulent and laminar solder flow at the edge nearer to the longitudinal centerline of the connector shown in FIG. 2.

FIG. 13 compares the average Cu thickness measured at the edge of the respective connectors but near the longitudinal centerline of the connector and exhibited similar results to those shown in FIG. 12.

It will be noted from FIGS. 11-13 that the conventional flow well exhibited slightly less Cu dissolution at the edge of the connectors than did the more laminar flow well 50. This is likely the result of the redirection of the solder flow at the center of the flow well 50 towards the ends of the flow well 50, resulting in a relatively higher flow rate at the ends of the connector 36.

However, it can be seen that, especially in FIG. 11, the more balanced flow in the flow well 50 greatly reduces the Cu dissolution at the centre portion of the connector. As a result, the overall Cu dissolution is more evenly distributed across the length of the connector when using the flow well 50 even though the Cu dissolution at the ends of the connector are relatively higher when compared to the conventional flow well. Such an even distribution inhibits drastic Cu dissolution at the centre of the connector as shown in FIG. 11 where using the conventional, more turbulent flow well, complete dissolution can occur (e.g. FIG. 8 explained below).

Figure 8:
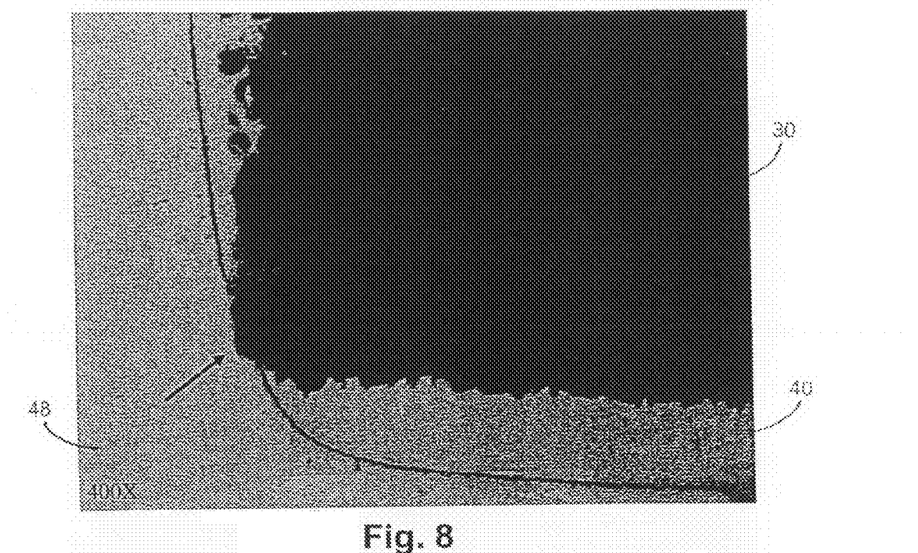
FIG. 8 is an enlarged photograph showing the effects of Cu dissolution using a conventional flow well.
Figure 9:
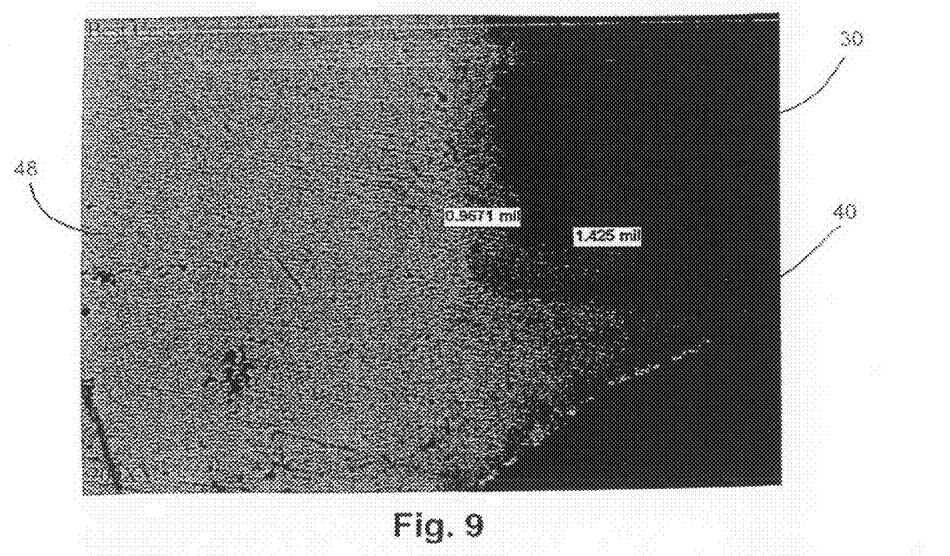
FIG. 9 is an enlarged photograph showing the effects of Cu dissolution using the flow well shown in FIG. 4.

The effect of Cu dissolution in a conventional flow well is shown in FIG. 8 and the effect of Cu dissolution in the more laminar flow well 50 is shown in FIG. 9. A complete dissolution of the barrel knee 44 is shown in FIG. 8 and a "best case" result for the flow well 50 is shown in FIG. 9 wherein the Cu thickness is largely unaffected by the PTH rework process.

Figure 14:
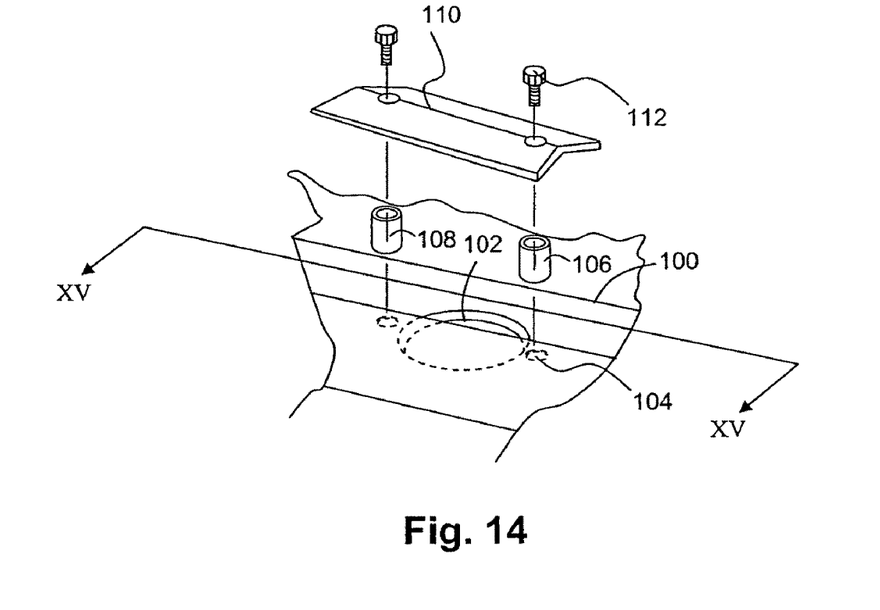
FIG. 14 is a perspective view of another embodiment.

In another embodiment shown in FIG. 14, a conventional flow well 100 is adapted to include a separate and detachable baffle mechanism or attachment 110 as the flow distribution element used to create a more laminar solder flow. The flow well 100 includes an opening 102 for solder to flow through and has an attachment mechanism by way of a pair of holes 104 for attaching the baffle attachment 110 to the flow well 100. The baffle attachment 110 is supported by a pair of posts 106, 108 and secured to the flow well 100 using a pair of screws 112 thus positioning the attachment 110 above the opening 102. As a result, the baffle attachment 110 redirects solder flow to produce a more horizontal and thus more laminar flow similar to the embodiment described above. This embodiment is particularly useful for retrofitting existing flow well components.

Figure 15:
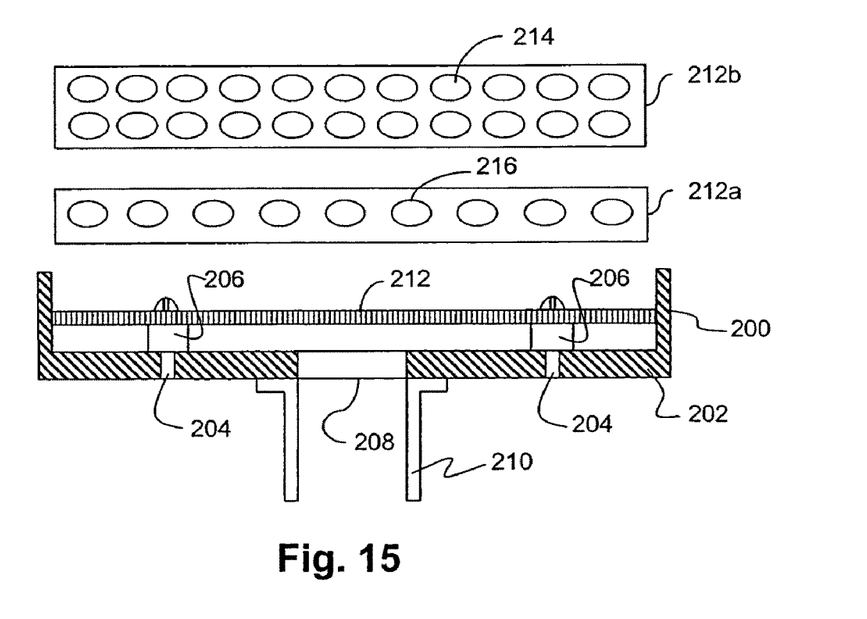
FIG. 15 is a sectional view along the line XV-XV of FIG. 14 of yet another embodiment.

In yet another embodiment shown in FIG. 15, the floor 202 of a conventional flow well 200 can be retrofitted to include a flow distribution element having an attachment mechanism, e.g. by modifying the flow well 200 to include a pair of holes 204 for securing a perforated plate 212 atop a pair of posts 206. As shown in FIG. 15, any perforation pattern may be used, such as the single row pattern 216 of the plate 212a and the double row pattern 214 of the plate 212b. The solder flowing through the outlet 210 and the opening 208 is distributed through the perforations to provide a more even and thus more laminar solder flow in the flow well 200.

It will be appreciated that in yet another embodiment (not shown), the plates 212a, 212b may also be used in conjunctions with the embodiment of FIG. 4 in addition to the inclined passages 84, 86.

It has therefore been shown that turbulent solder flow, particularly at the opening of a conventional flow well, correlates to a greater degree of Cu dissolution of the PTH barrels of a PCB, especially those that are substantially aligned with the opening. By incorporating a flow distribution element such as a baffle or diffuser in a modified or retrofitted flow well a more laminar solder flow is created to more evenly distribute the solder flow and thus reduce the rate of Cu dissolution near the flow well opening, particularly during a PTH rework process. It can be seen that existing flow wells can be retrofitted or custom flow wells can be manufactured to include the flow distribution element. It can be appreciated that the flow distribution element can comprise any device or modification of the flow well that, when used, distributes solder in the flow well resulting in a less turbulent solder flow.

Although the invention has been described with reference to certain specific embodiments, various modifications thereof will be apparent to those skilled in the art without departing from the spirit and scope of the invention as outlined in the claims appended hereto.

The invention claimed is:

1. A flow well for a solder fountain, the flow well comprising:
   an opening for receiving a flow of solder from said solder fountain;
   an open face spaced from said opening, said open face for providing a single surface of solder, wherein said flow of solder fills said flow well between said opening and said open face in creating said single surface of solder; and
   a flow distribution element disposed between said opening and said open face such that said flow distribution element is spaced from said open face, said flow distribution element comprising a baffle mechanism to redirect solder flow towards opposite sides of said opening and around said flow distribution element to distribute said flow of solder along said surface of solder.

2. The flow well according to claim 1 wherein said baffle mechanism is formed in a base of said flow well as a pair of passages for redirecting said solder flow to said either side of said opening.

3. The flow well according to claim 2 wherein said passages are inclined with respect to said base.

4. The flow well according to claim 1 wherein said baffle mechanism comprises a plate secured above said opening and spaced therefrom.

5. The flow well according to claim 4 wherein said plate is spaced from said opening using a plurality of posts.

6. The flow well according to claim 1 wherein said flow distribution element is retrofitted to an existing flow well.

7. The flow well according to claim 1 wherein a base of said flow well comprises opposite surfaces sloping towards said opening.

8. The flow well according to claim 1 comprising a spill mechanism for returning solder to said solder fountain.

9. The flow well according to claim 1 comprising an adapter for securing said flow well to said solder fountain.

10. The flow well according to claim 9 wherein said flow well attaches to said adapter using a pair of flanges extending outwardly from a base of said flow well.

11. The flow well according to claim 1 being included with said solder fountain.

12. A method for retrofitting an existing flow well for providing laminar flow, said method comprising:
   obtaining a flow well having an opening for receiving a flow of solder from said solder fountain, and an open face spaced from said opening, said open face for providing a single surface of solder, wherein said flow of solder fills said flow well between said opening and said open face in creating said single surface of solder; and
   attaching a flow distribution element to said flow well such that it is spaced from said open face and interposed between said opening and said open face;
   wherein said flow distribution element comprises a baffle mechanism to redirect solder flow towards opposite sides of said opening and around said flow distribution element to distribute said flow of solder along said surface of solder.

13. The method according to claim 12 wherein said baffle mechanism is formed in a base of said flow well as a pair of passages for redirecting said solder flow to said either side of said opening.

14. The method according to claim 13 wherein said passages are inclined with respect to said base.

15. The method according to claim 12 wherein said baffle mechanism comprises a plate secured above said opening and spaced therefrom.

16. The method according to claim 15 wherein said plate is spaced from said opening using a plurality of posts.

17. The method according to claim 12 wherein a base of said flow well comprises opposite surfaces sloping towards said opening.

18. The method according to claim 12 comprising providing a spill mechanism for returning solder to said solder fountain.

19. The method according to claim 12 comprising providing an adapter for securing said flow well to said solder fountain.

20. The method according to claim 19 wherein said flow well attaches to said adapter using a pair of flanges extending outwardly from a base of said flow well.

* * * * *